United States Patent [19]

Blomberg et al.

[11] Patent Number: 4,734,977

[45] Date of Patent: Apr. 5, 1988

[54] METHOD AND APPARATUS FOR MANUFACTURING STORAGE BATTERY PLATE ASSEMBLIES

[75] Inventors: Mats Blomberg; Markku Loponen, both of Porvoo, Finland

[73] Assignee: Neste Oy, Finland

[21] Appl. No.: 30,669

[22] Filed: Mar. 26, 1987

[30] Foreign Application Priority Data

Mar. 25, 1986 [FI] Finland .................................. 861272

[51] Int. Cl.⁴ ............................................. H01M 4/20
[52] U.S. Cl. .................................... 29/623.5; 141/1.1; 429/210
[58] Field of Search ............................ 29/623.5, 623.1; 429/210; 141/1.1, 32; 252/182.1

[56] References Cited

U.S. PATENT DOCUMENTS 4,271,586 6/1981 McCartney, Jr. .................. 29/623.5
4,469,145 9/1984 Fletcher et al. ............... 29/623.5 X
4,499,929 2/1985 Shima et al. .................... 29/623.5 X Primary Examiner—Anthony Skapars
Attorney, Agent, or Firm—Steinberg & Raskin

[57] ABSTRACT

Method and apparatus for manufacturing plate assemblies for bipolar or semibipolar storage batteries containing bipolar and monopolar plates having positive and/or negative active masses. Forming apparatus is disposed to form on an electrically insulating support material, a plate frame web containing longitudinally continuous and transversely spaced plate frame blanks containing electrically conductive material. Adding apparatus is disposed to add onto the plate frame web containing the plate frame blanks, longitudinally continuous and transversely spaced zones constituted by alternative positive and negative active masses. Cutting apparatus are disposed to cut by transverse and longitudinal cutting lines, plate assembly blanks containing bipolar and/or monopolar plates from the plate frame web containing the active mass zones.

6 Claims, 5 Drawing Sheets

METHOD AND APPARATUS FOR MANUFACTURING STORAGE BATTERY PLATE ASSEMBLIES

BACKGROUND OF THE INVENTION

The present invention concerns a procedure for manufacturing plate assemblies for a bipolar or semibipolar storage battery comprising bipolar and monopolar plates which contain positive and/or negative active masses.

The invention also concerns apparatus for manufacturing plate assemblies for a bipolar or semibipolar storage battery containing bipolar and monopolar plates which contain positive and/or negative active mass.

The manufacturing of traditional lead storage batteries involves a great number of working steps, which are difficult to automate. Moreover, the work steps required in standard manufacturing methods impose certain strength requirements on the storage battery plate assemblies. Consequently, one has to use for the storage battery plates, unnecessarily large quantities of material in view of the operation of the storage battery. This adds to the weight of the storage batteries and increases the manufacturing costs.

SUMMARY OF THE INVENTION

Accordingly, it is an object of the present invention to improve over methods known in the art for manufacturing storage battery plates.

It is also an object of the present invention to provide a method and apparatus to enable the manufacturing of storage battery plates and assembly of the completed storage battery to be carried out in a continuous process and in a simple manner.

These and other objects are attained by the present invention which is directed to a method for manufacturing a plate assembly for a bipolar or semibipolar storage battery comprising monopolar plates containing a positive or negative active mass, and bipolar plates comprising positive and negative active masses, which comprises the steps of forming upon an electrically insulating support material a plate frame web containing longitudinally continuously and transversely-spaced plate frame blanks containing electrically conductive material, adding upon the plate frame web containing the plate frame blanks zones constituted by alternating positive and negative active masses which are continuous over the longitudinal direction and transversely spaced from one another, and cutting the plate blanks into monopolar or bipolar plates with tranverse and longitudinal cuts into the plate frame web containing the active mass zones.

The present invention is also directed to apparatus for manufacturing a plate assembly for a bipolar or semibipolar storage battery comprising monopolar plates containing a positive or negative active mass, and bipolar plates comprising positive and negative active masses, which comprises means for forming upon an electrically insulating support material a plate frame web containing longitudinally continuous and transversely spaced plate frame blanks containing electrically-conductive material, means for adding upon the plate from web containing the frame blanks longitudinally continuous and transversely spaced zones of alternating positive and negative active masses, and means for cutting the plate blanks into monopolar or bipolar plates with transverse and longitudinal cuts into the plate frame web containing the active mass zones.

Thus the objects of the invention are achieved by the method which is principally characterized in that:

(a) on an electrically insulating support material, a plate frame web is produced containing longitudinally continuous plate frame blanks containing electrically conductive material which are also transversely spaced from one another;

(b) on the plate frame web containing the plate frame blanks, longitudinally continuous and transversely spaced zones are added which are constituted by alternating positive and negative active masses; and (c) the plate frame web containing the active mass zones is cut up with transverse cuts into plate assembly blanks containing bipolar and/or monopolar plates.

An object of the present invention is also to achieve improvement over the apparatus of the prior art for producing storage battery plate assemblies. This and other objects of the invention are achieved with the aid of apparatus principally characterized by comprising shaping means which have been disposed to produce on an electrically insulating support material, a plate frame web containing longitudinally continuous plate frame blanks of electrically conductive material and which are transversely spaced from one another, adding means disposed for adding onto the plate frame web containing the plate frame blanks, longitudinally continuous and transversely spaced zones of alternating positive and negative active masses, and cutting means disposed for cutting the plate frame web containing the active mass zones with transverse and longitudinal cuts to separate plate assembly blanks containing bipolar and/or monopolar plates.

Thus, in accordance with the present invention, a procedure is obtained for manufacturing lead storage battery plate assemblies in a continuous manner and for automatically assembling storage batteries. The procedure of the present invention makes it possible to manufacture in series by machine production, whereby little manual work, if any, is required.

Also, in accordance with the present invention, a production and assembly line for lead storage battery plate assemblies is obtained, in which the following principles are achieved:

The plate frames are manufactured in the form of a continuous strip of support material, for instance webbing, and a plate frame cast thereon or joined in another manner thereto, along with active mass pasted upon the plate frame web, also in the form of continuous strips. The continuous plate frame web is then cut up into separate plate frames which are stacked together with separator plates to become completed storage battery plate assemblies;

the plate frames thus produced are either monopolar plates for end cells or bipolar plates for intermediate cells. Both plate frame types are advantageously produced, though not necessarily, in one in the same work step; and between the plate frames stacked in final position in a storage battery case, partitions are formed of a flowing, electrically insulating material impermeable to electrolyte, which is cured in situ.

The new manufacturing technique presented herein offers remarkable advantages over the conventional production techniques. Since the support material of the plate frames takes up the mechanical stresses occuring during production and service of the storage battery, the plate frames can be optimized with respect to the electrical properties thereof. Since the plates are cast in the form of a continuous strip, the wiring interconnecting the plates may also be produced at the same time, with the number and shape of such leads also being optimized in the manner which is best in view of the operation of the storage battery.

Producing the cell partitions by means of injecting a hardening electrically insulating material impermeable to the electrolyte, enables the assembly of the storage battery to be performed almost to completion in one automatically continuing work step.

Although the invention has been described in this context with respect to a lead storage battery, it is clear that the techniques of the invention may also be applied to such storage batteries in which another material is used as the storage battery plate material.

BRIEF DESCRIPTION OF THE DRAWINGS

The present invention will now be described in greater detail with reference to certain advantageous embodiments illustrated in the accompanying figures, to which the present invention is not intended to be exclusively confined in the drawings.

DESCRIPTION OF THE PREFERRED EMBODIMENTS

Figure 1:
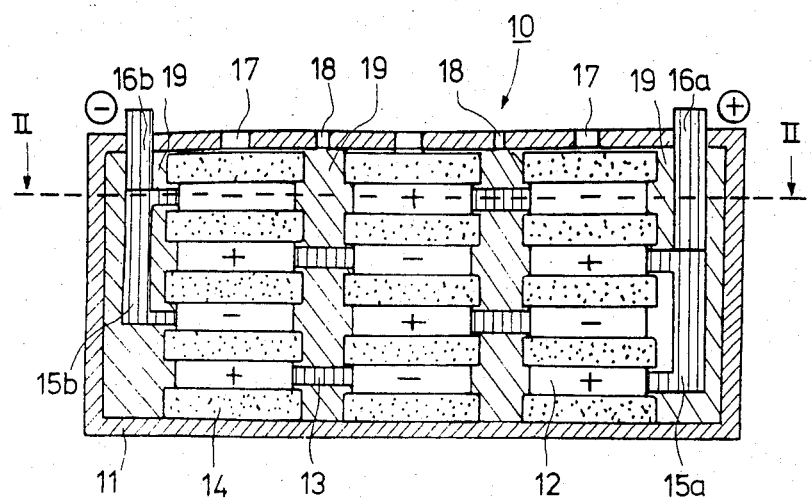
FIG. 1 is a cross-sectional view of a storage battery, the plate assemblies of which have been produced in accordance with the present invention.
Figure 2:
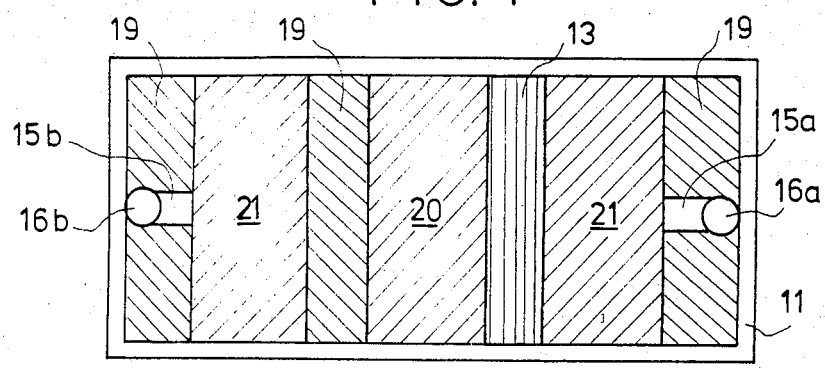
FIG. 2 is a sectional view along line II—II in FIG. 1.

In the embodiment illustrated in FIGS. 1 and 2, a 6 Volt storage battery is generally indicated by reference numeral 10. The storage battery 10 comprises one or several cells enclosed in a case 11. Each cell contains electrolyte, monopolar plates 12 and bipolar plates 13 coated with positive and/or negative active mass and separated by separator plates 14. Furthermore, the storage battery 10 contains the requisite electrically conductive connectors which connect plates 12, 13 and/or cells together. The wall separating each cell from adjacent cells or from the case 11, or sealing it off, is produced by filling the spaces surrounding the plate stacks located in the case 11 and the spaces therebetween with an electrically insulating substance 19 impermeable to electrolyte and which has been cured directly in place to establish tightly sealing and/or insulating walls.

In FIGS. 1 and 2, lugs connecting plates with the same polarity are indicated with reference nos. 15a or 15b. The positive terminal of the storage battery is indicated with reference nos. 16a and the negative terminal with reference no. 16b. Reference no. 18 indicates an injection aperture through which the electrically insultating substance 19 impermeable to the electrolyte is inserted into the casing 11. Reference no. 17 denotes an acid supplying aperture, through which the storage battery 10 is filled with acid in a manner known in the prior art in order to obtain a storage battery ready for use.

Figures 3A, 3B, 3C:
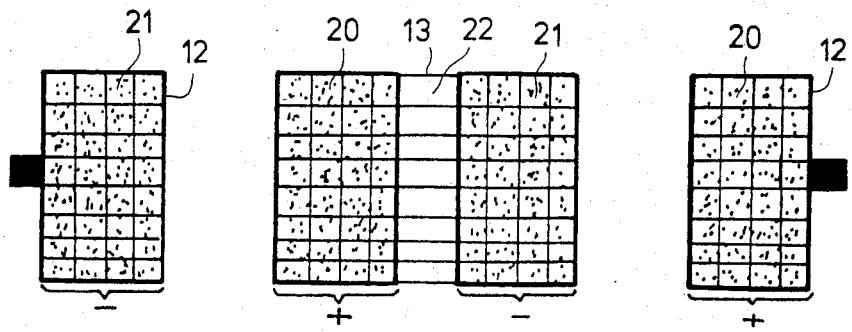
FIG. 3a is a top view of an advantageous embodiment of a negative monopolar plate frame used in the storage battery of FIG. 1.
FIG. 3b is a top view of an advantageous embodiment of a bipolar plate frame used in the storage battery of FIG. 1.
FIG. 3c is a top view of an advantageous embodiment of a positive monopolar plate frame used in the storage battery of FIG. 1.

As illustrated in FIG. 3a, the monopolar plate frame 12 is provided with negative active mass 21, while the bipolar plate frame 13 in FIG. 3b is provided with positive active mass 20 and negative active mass 21, and the intervening portion 22 is uncoated. As seen in FIG. 3c, the monopolar plate frame 12 is provided with positive active mass 20.

The electrically conductive bipolar plate or bipolar plate gride 13 is composed of a reticular structure containing electrically conductive material, one end 20 thereof being coated with positive and the other end 21 with negative active mass, while the intervening part 22 remains uncoated. This type of reticular structure is constituted by a supporting structure which does not conduct electricity and to which electrically conductive wires or an electrically conductive reticular structure have been joined.

In an advantageous embodiment of the invention as illustrated in FIG. 1, the storage battery comprises monopolar and bipolar plates 12, 13, stacked upon each other and also separator plates 14 interposed therebetween as illustrated, so that in the outer cells, every second plate is monopolar, 12, and every second plate is an end with opposite polarity of a bipolar plate 13 as clearly illustrated. The intermediate cells contain ends with opposite polarity of bipolar plates 13 in alternation. At the points between cells, the uncoated portions 22 of the bipolar plates 13 are in register and constitute the electric leads 34 passing through the insulating and/or sealing partition that has been formed upon curing of the electrically insulating and electrolyte impermeable substance 19.

Figure 4:
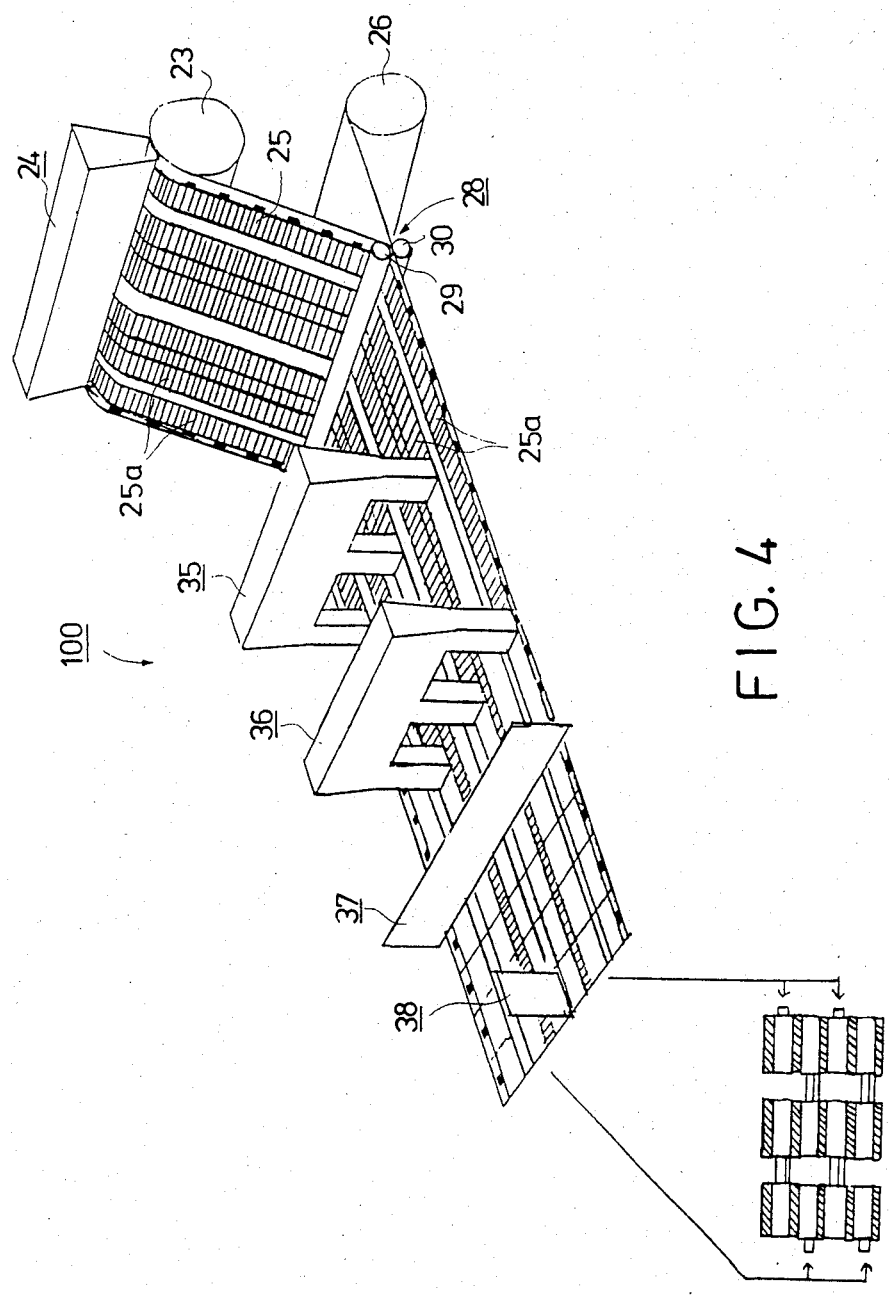
FIG. 4 is a schematic axonometric projection of an advantageous embodiment of apparatus of the invention for producing the storage battery plate assemblies.

In the embodiment illustrated in FIG. 4, the apparatus of the invention for manufacturing storage battery plate assemblies has been generally indicated with reference no. 100. The apparatus 100 comprises, in this illustrated embodiment, a continuous-action casting drum 23 to which molten lead is fed from a feeding funnel 24, and a support net roll 26 for feeding a support net web 27 under the plate frame web 25 that has been cast, in addition to a hot-roll 28 for joining the cast plate frame web 25 to the support net web 27 by hot rolling. Adding means 35 and 36 for adding negative or positive active mass on top of the plate frame/support net web 31, along with cutting means 37 and 38 for cutting the plate frame parts required in The manufacturing of the storage battery, are also provided. The adding means are disposed to press the strip-like positive active masses 20, and the strip-like negative active masses 21 in place upon the plate frames 25a. The cutting means 37, 38, preferably comprise high velocity water jets. FIG. 4 schematically presents the stacking of monopolar and bipolar plates together with separator plates 14 to form a blank for a 6 V storage battery.

Figure 5:
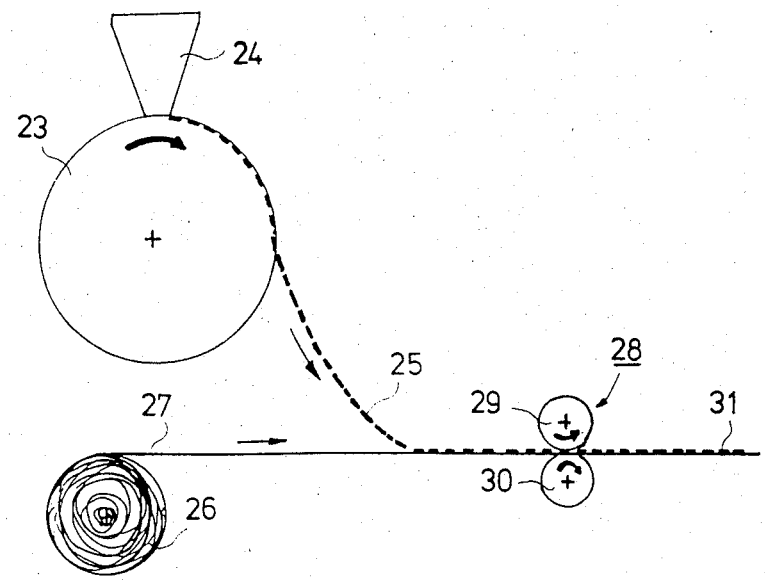
FIG. 5 is a schematic elevational view of an advantageous embodiment of the apparatus of the invention for producing a plate frame web on a support material web.

In the embodiment illustrated in FIG. 5, molten lead is fed onto the continuous-action casting drum 23 from the feeding funnel 24. When the casting drum 23 is rotated in the direction indicated by the arrow, a cast plate frame web 25 is produced. From the support net roll 26, the support net web 27 is fed in under the cast plate frame web 25 as indicated with an arrow. The support net web 27 and the plate frame web 25 deposited thereon, pass through the hot-roll 28. The upper roll of the hot-roll 28 is indicated by Reference No. 29, and the lower roll with reference no. 31. In FIG. 5, the completed support net/plate frame web is indicated by Reference No. 31. In the embodiment of FIG. 5, the plate frame web 25 produced by continuous casting is thus connected to the support net web 27 by means of hot-rolling.

Figure 6:
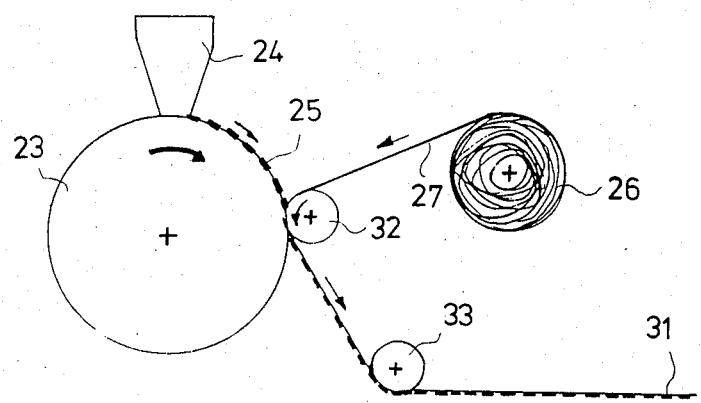
FIG. 6 is a schematic elevational view of another advantageous embodiment of the apparatus of the invention for producing a plate frame web on a support material web.

In the embodiment of FIG. 6, the support net web 27 coming from the support net roll 26 in the direction indicated by an arrow, is pressed against the casting drum 23 at a suitable temperature. Reference no. 32 indicates an auxiliary roll disposed to press the cast plate frame web 25 and the support net web 27 against the casting drum 23. Reference no. 33 indicates an auxiliary roll located lower down, after which the support net/plate frame web 31 travels in the direction indicated by an arrow. In this embodiment, the support net web 27 is above the plate frame web 25. When the procedure of FIG. 6 is applied, it is not necessary to cut any metallic lead in the subsequent cutting phase, since the plate frames 25a may be cast in separate pieces.

Figure 7:
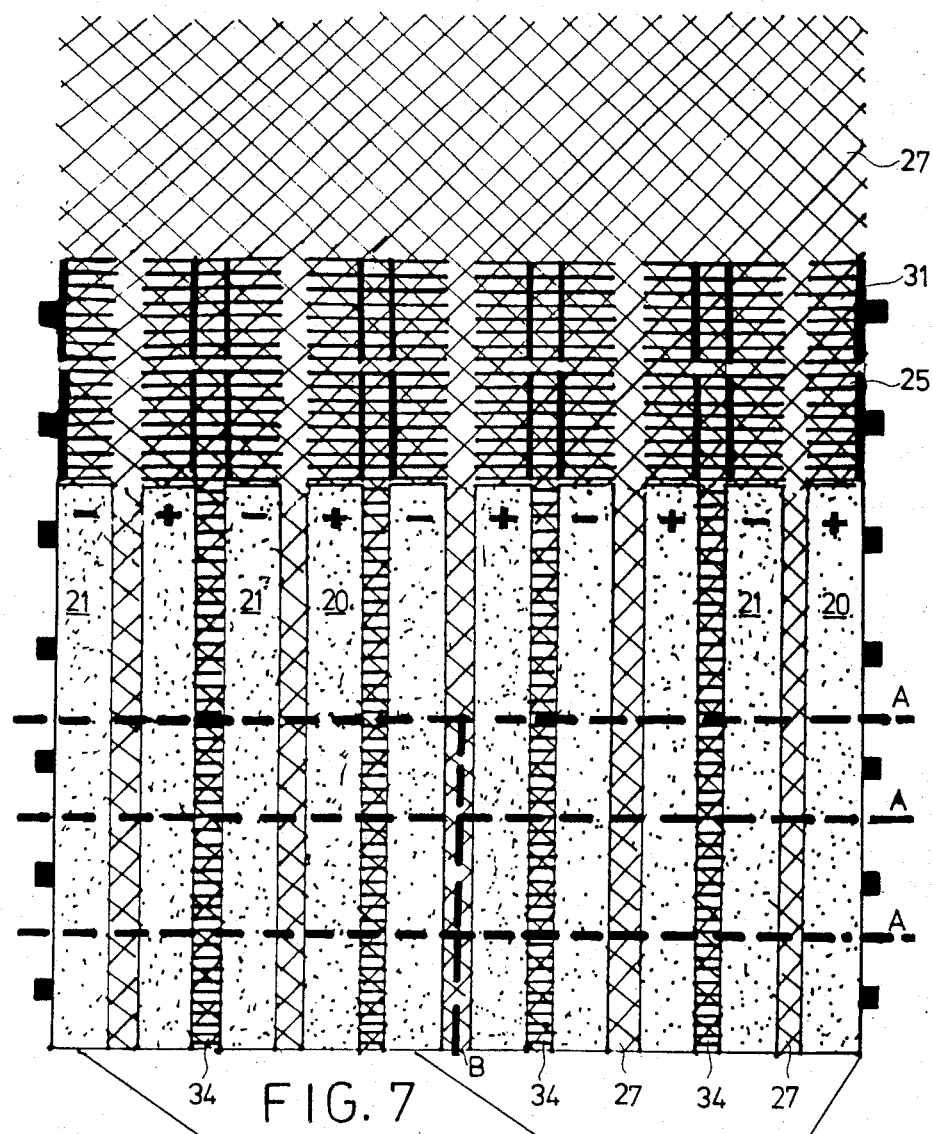
FIG. 7 is a top view, partially schematic, of a plate frame web and a manner in which the plate frame parts required for manufacturing a storage battery can be cut from the plate frame web.

As illustrated in FIG. 7, it is possible to manufacture by the procedure and apparatus of the present invention, modular plate assemblies for a lead storage battery, for example in the following manner. Upon a plastic or glass fiber net web 27 used as the supporting structure, plate frames 25a are cast with a continuous-action casting machine. Since the supporting structure 27 takes up or absorbs any mechancial stresses, the plate frames 25a can be optimized with respect to the electrical properties thereof. When the casting technique illustrated in FIG. 5 is utilized, there may be a plurality of leads for each plate frame 25a from one cell to another. After the casting, the plastic/lead web 31 is passed to a pasting step, in which the positive active masses 20 and the negative active masses 21 are pressed into place upon the plate frames 25a. The web 31 is then cut up into plate assemblies, so that each plate assembly has either a positive or a negative monopolar plate 12 at one end thereof, and the requisite number of bipolar plate 13. In the embodiment illustrated in FIG. 7, the transverse cutting lines are indicated by Letter A, while the longitudinally cutting line is indicated by Letter B. The leads connecting the plate frames 25a are indicated by Reference no. 34.

Figure 8:
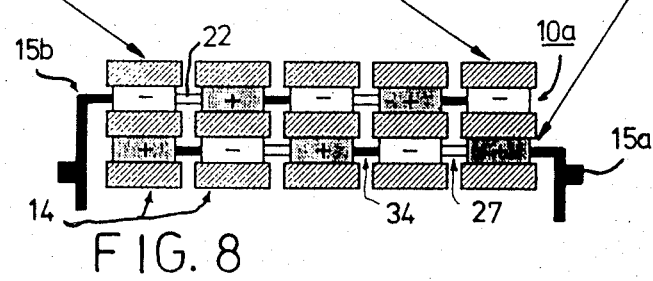
FIG. 8 is a schematic cross-sectional view illustrating the stacking of completed plate frames.

As illustrated in FIG. 8, the monopolar plates 12 and the bipolar plates 13 are stacked together with separator plates 14 to form the blanks of a storage battery 10a. This type of blank contains at least two layers of plates so that one plate layer ends at one with a negative plate, and the other plate layer at the opposite end in a positive monopolar plate. When a storage battery contains several blanks, these are interconnected in parallel by casting lead jumpers to connect the lugs 15a and 15b of the monopolar plates. Alternatively, the lugs 15a and 15b may be electrically interconnected to the respective lugs of the other blanks in another manner. The blanks are packed in cases 11 for forming the separating partitions 19. Dry-out ripening, acid supply and forming are accomplished by a technique known in and of itself in the art, disclosed for example in Finnish patent Application No. 85 5096. An example of how a 12 V storage battery 10a is manufactured, is presented in FIG. 8.

Figure 9:
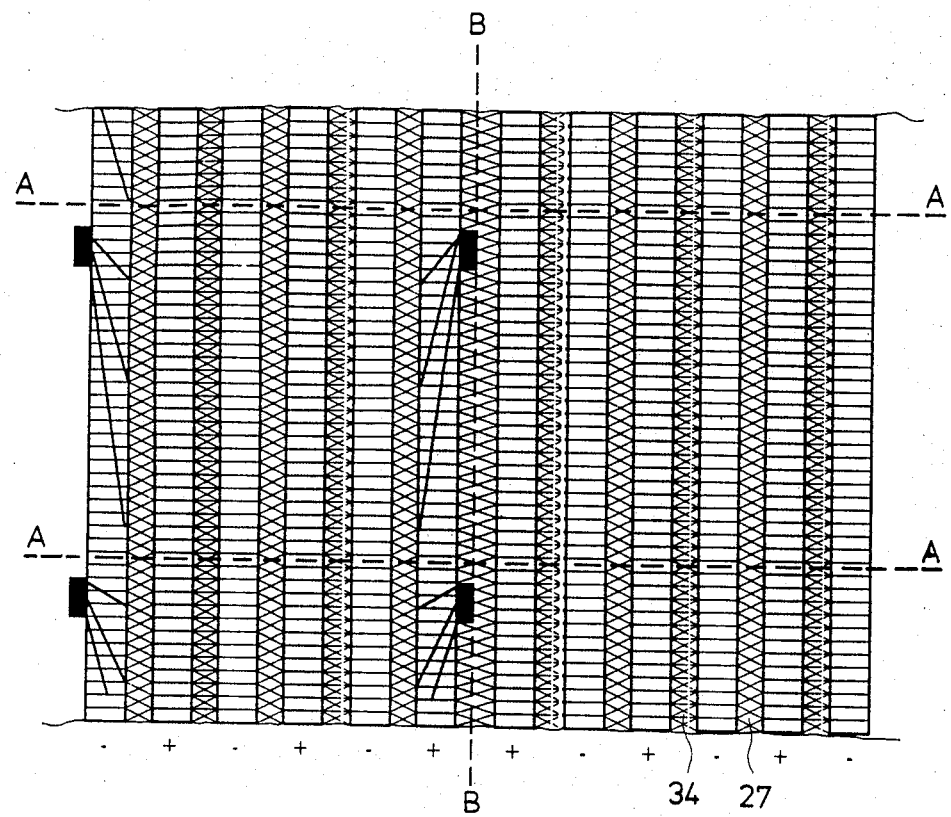
FIG. 9 is a top view, partially schematic, of a second plate frame web and the manner in which the required plate frame parts for producing a storage battery can be cut from this second plate frame web.
Figure 10:
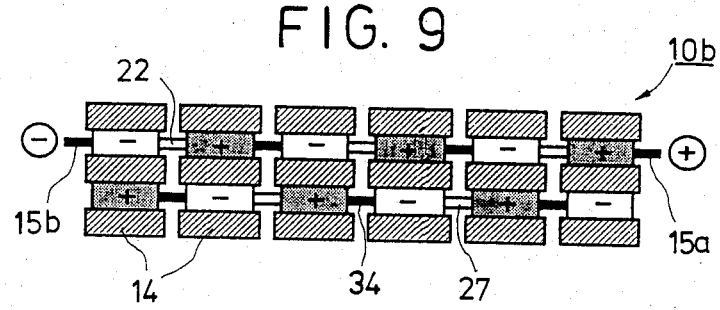
FIG. 10 is schematic cross sectional view of another mode of stacking completed plate frames cut from the plate frame web of FIG. 9.

As depicted in FIGS. 9 and 10, in an advantageous embodiment of the invention, the steps for manufacturing a blank for a 12 volt storage battery 10b are as follows. First, the starting point is a support net web 27 of width twice the length of a completed storage battery 10b. Upon this support net web 27, the plate frames 25a are attached, for instance, by applying the casting technique of FIG. 5. Next, the plate frames 25a are pasted 35, 36, with the zones of active masses 20 and 21 in the following step as illustrated in FIG. 4. The pasting may be carried out with a pasting machine 35, 36, which produces band-like strips of active mass on the appropriate areas of the plate frames 25a. The areas between the active mass strips 20, 21, remain free of mass. Insulating material 19 is later injected upon these areas 22, to form the cell partitions.

The bipolar plates 13 are formed by these pairs of strips, where the plate frames 25a with positive and negative active mass 20, 21 are fused together. The monopolar plates 12 are outermost on the sides as illustrated.

Lugs 15a and 15b are cast on the monopolar plates 12 by which the plates are connected to the terminal posts 16a and 16b subsequent to stacking of the storage battery 10b. The web 31 is cut up into plate assemblies in the manner illustrated by the cutting lines A and B, with the plate assemblies being stacked together with separator plates 14 to become blanks for a storage battery 10b, as depicted in FIG. 10.

The separator plates 14 may also be connected to the active mass strips 20, 21, prior to cutting, which considerably simplifies the stacking. In other words, the plate frame web 25 containing the active mass zones 20, 21 and a web containing separator mass 14, are conducted in superimposed contact to the cutting phase 35, 36 for the purpose of cutting the storage battery plates and the separator plates in a single operational phase or step.

The cutting of the web 31 along the lines A and B may be accomplished, e.g., by means of a high velocity water jet. An example of manufacturing a 12 V semibipolar storage battery is presented in FIG. 10.

The preceding description of the present invention is merely exemplary, and is not intended to limit the scope thereof in any way.

We claim:

1. Method for manufacturing a plate assembly for a bipolar or semibipolar storage battery comprising monopolar plates containing a positive or negative active mass, and bipolar plates comprising positive and negative active masses, comprising the steps of forming upon an electrically insulating support material, a plate frame web containing longitudinally continuously and transversely-spaced plate frame blanks containing electrically conductive material, adding upon the plate frame web containing the plate frame blanks, zones constituted by alternating positive and negative active masses which are continuous over the longitudinal direction and trnsversely spaced from one another, and cutting the plate blanks into monopolar or bipolar plates with transverse and longitudinal cuts into the plate frame web containing the active mass zones.

2. The method of claim 1, wherein the plate frame web is formed upon the support material by casting a lead blank to constitute plate frames and wiring connecting the same.

3. The method of claim 2, comprising the additional step of hot-rolling the casted lead blank and support material to join the same together.

4. The method of claim 2, comprising the additional step of pressing the support material and the lead blank against a casting drum to join the same together.

5. The method of claim 1, comprising the additional step of applying a layer of separator material to the plate blanks prior to the step of cutting, whereby all cutting of blanks and material to form the plates may be carried out in a single step.

6. The method of claim 1, comprising the additional steps of stacking the thus-cut plates with a layer of separator material interposed therebetween, in a casing, and injecting electrically-insulating material into the casing to fill spaces between adjacent plates.

* * * * *